(12) United States Patent
Wei et al.

(10) Patent No.: US 11,627,702 B2
(45) Date of Patent: Apr. 18, 2023

(54) RIDING LAWN MOWER WITH CONNECTING DEVICE

(71) Applicant: Globe (Jiangsu) Co., Ltd, Jiangsu (CN)

(72) Inventors: Qunli Wei, Jiangsu (CN); Dongdong Shi, Jiangsu (CN); Linchong Wu, Jiangsu (CN); Jiafu Xue, Jiangsu (CN); Hui Chen, Jiangsu (CN)

(73) Assignee: Globe (Jiangsu) Co., Ltd, Changzhou (CN)

( * ) Notice: Subject to any disclaimer, the term of this patent is extended or adjusted under 35 U.S.C. 154(b) by 321 days.

(21) Appl. No.: 16/914,362

(22) Filed: Jun. 27, 2020

(65) Prior Publication Data
US 2020/0404828 A1 Dec. 31, 2020

(30) Foreign Application Priority Data

Jun. 28, 2019 (CN) .......................... 201910572925.6

(51) Int. Cl.
*A01D 34/00* (2006.01)
*A01D 42/08* (2006.01)
(Continued)

(52) U.S. Cl.
CPC .......... *A01D 75/008* (2013.01); *A01B 59/064* (2013.01); *A01D 34/001* (2013.01);
(Continued)

(58) Field of Classification Search
CPC .............. A01B 59/064; A01D 2101/00; A01D 34/046; A01D 34/082; A01D 34/001;
(Continued)

(56) References Cited

U.S. PATENT DOCUMENTS

| 3,422,553 A | * | 1/1969 | Holloway | .............. | A01D 42/08 |
| | | | | | 37/231 |
| 3,882,615 A | * | 5/1975 | Williams | .............. | A01D 42/08 |
| | | | | | 37/243 |

(Continued)

FOREIGN PATENT DOCUMENTS

| CN | 102126769 A | 7/2011 |
| CN | 207219411 U | 4/2018 |

OTHER PUBLICATIONS

Enxia Yang, Mechanism Design, May 31, 2017, pp. 87-90, Harbin Engineering University Press.

*Primary Examiner* — Adam J Behrens (57) ABSTRACT

A riding lawn mower includes a frame, a mowing device mounted to the bottom of the frame, a functional unit attached to the front of the frame, and a motor group together with a power supply mounted to the frame. The riding lawn mower also comprises a connecting device connecting the frame and the functional unit. The connecting device comprises a first connector attached on the front of the frame, a second connector attached to the functional unit, and a third connector adapted for fixedly connecting the first connector and the second connector, the first connector and the second connector respectively defining through-holes thereon, the third connector extending through the through-holes of the first and the second connectors to fixedly connect the first and the second connectors.

9 Claims, 6 Drawing Sheets

(51) Int. Cl.
  *A01D 75/00* (2006.01)
  *A01B 59/06* (2006.01)
  *A01D 34/04* (2006.01)
  *A01D 67/00* (2006.01)
  *A01D 101/00* (2006.01)
  *A01D 34/82* (2006.01)
(52) U.S. Cl.
  CPC ........... *A01D 34/046* (2013.01); *A01D 42/08* (2013.01); *A01D 67/005* (2013.01); *A01D 34/82* (2013.01); *A01D 2101/00* (2013.01)
(58) Field of Classification Search
  CPC ........ A01D 42/08; A01D 42/00; A01D 42/02; A01D 42/04; A01D 42/06; A01D 75/00; A01D 75/008; A01D 67/005
  See application file for complete search history.

(56) References Cited

U.S. PATENT DOCUMENTS

| | | | |
|---|---|---|---|
| 4,541,230 A * | 9/1985 | Huerter | A01D 42/02 56/193 |
| 4,680,880 A * | 7/1987 | Boneta | E01H 5/06 37/236 |
| 4,987,731 A * | 1/1991 | Cianciulli | A01D 42/02 56/16.7 |
| 4,989,676 A * | 2/1991 | Rogers | A01D 42/06 172/438 |
| 6,241,025 B1 * | 6/2001 | Myers | A01B 35/28 172/253 |
| 6,415,872 B2 * | 7/2002 | Myers | A01B 45/02 172/253 |
| 6,832,657 B1 * | 12/2004 | LaFlair | A01B 45/02 172/540 |
| 6,938,699 B2 * | 9/2005 | Templeton | A01D 34/84 172/14 |
| 9,545,050 B2 * | 1/2017 | Fichera | A01D 34/001 |
| 9,839,176 B1 * | 12/2017 | Snyder | A01B 35/24 |
| 10,058,030 B2 * | 8/2018 | Hoppel | A01D 34/80 |
| 2006/0096133 A1 * | 5/2006 | Sanders | A01D 42/08 37/241 |
| 2010/0288985 A1 * | 11/2010 | Steensma | A01D 75/008 254/131 |
| 2014/0174838 A1 | 6/2014 | Oswald et al. | |
| 2015/0096278 A1 * | 4/2015 | Sprinkmann | A01D 34/001 172/170 |
| 2016/0052567 A1 * | 2/2016 | Pugh | B62D 49/04 280/638 |
| 2016/0120131 A1 * | 5/2016 | Conrad | F04D 25/0673 15/319 |
| 2017/0000025 A1 * | 1/2017 | Hoppel | E02F 3/3677 |
| 2017/0079188 A1 * | 3/2017 | DeVries | E01H 5/098 |
| 2017/0265394 A1 * | 9/2017 | Hoppel | A01D 34/64 |
| 2018/0064030 A1 * | 3/2018 | Hoppel | A01D 43/12 |
| 2019/0216016 A1 * | 7/2019 | Hoppel | A01D 42/08 |
| 2021/0059118 A1 * | 3/2021 | Zhu | A01B 59/065 |

* cited by examiner

RIDING LAWN MOWER WITH CONNECTING DEVICE

CROSS-REFERENCE TO RELATED APPLICATIONS

This application is a US application which claims the priority of CN Application Serial No. 201910572925.6, filed on Jun. 28, 2019, the disclosures of which are hereby incorporated by reference in their entirety.

TECHNICAL FIELD

The present invention relates to a riding lawn mower, which belongs to the technology field of garden tool.

BACKGROUND ART

There are many categories of garden tools. In order to satisfy the daily needs of the user's family, the user need to purchase or rent garden equipment with various functions, such as lawn mowers, blowers, snow throwers, snow blower etc., as well as some auxiliary maintenance equipment or accessories. The lawn mower, blowers, snow throwers, snow blower are separated from each other. Single equipment, such as lawn mower, can only be used in certain periods of time. When it is not necessary to mow the lawn, the mower will be idle which results in waste. Blowers and snow thrower are same. However, in order to meet various of requirements during different periods of time, the user usually needs to prepare above-mentioned various of equipment or accessories, which undoubtedly generates a great of waste and bring a large financial burden on the user.

Hence, there is a need to improve the conventional lawn mowers to resolve the above problems.

SUMMARY OF INVENTION

The objective of the present invention is to provide a riding lawn mower, which can be added other accessories based on the lawn mower to thereby realize snow blowing, snow plowing and other functions.

In order achieve above-mentioned objectives, the present invention provides a riding lawn mower comprising: a frame, a mowing device, the mowing device mounted the bottom of the frame, a functional unit attached to the front of the frame, and a motor group together with a power supply mounted to the frame, wherein the riding lawn mower also comprises a connecting device connecting the frame and the functional unit, the connecting device comprising a first connector attached on the front of the frame, a second connector attached to the functional unit, and a third connector adapted for fixedly connecting the first connector and the second connector, the first connector and the second connector respectively defining through-holes thereon, the third connector extending through the through-holes of the first and the second connectors to fixedly connect the first and the second connectors.

As a further improvement of the present invention, wherein the first connector provides a receiving slot, and one end of the second connector is retained in the receiving slot.

As a further improvement of the present invention, wherein both the first connector and the second connector are square, and the receiving slot is square correspondingly.

As a further improvement of the present invention, wherein the through-holes comprise a first through-hole defined on the first connector and a second through-hole defined on the second connector, the first through-hole extending through-out the first connector and the second through-hole extending through-out the second connector.

As a further improvement of the present invention, wherein the third connector is a fixed pin that passes through the first through-hole and the second through-hole sequentially.

As a further improvement of the present invention, wherein the connecting device also comprises a buckle piece provided on a top of the front of the frame and a fastener piece provided on the functional unit, the buckle piece engaging with the fastener piece to securely connect the frame and the functional unit.

As a further improvement of the present invention, wherein the connecting device further comprises a reinforcing plate with one end thereof fastened to the front of the frame and the other end thereof fastened to the functional unit, the reinforcing plate positioned a bottom of the first connector and the second connector.

As a further improvement of the present invention, wherein the connecting device further comprises an electrical interface provided on the front of the frame, the electrical interface having one end electrically connecting to the power supply and the other end connecting to the functional unit, so as to provide power to the functional unit.

As a further improvement of the present invention, wherein the first connector is arranged in a middle of the front of the frame and the electrical interface is located besides the first connector.

As a further improvement of the present invention, wherein the functional unit is one of snow blower, snow thrower, snow plow, and a jack.

The beneficial effects of the present invention are: The riding lawn mower of the present invention is provided with the connecting device, which includes the first connector located at the front end of the frame, the second connector located on the functional unit, and the third connector for fixedly connecting the first and the second connectors, so that the riding lawn mower of the present invention can be stably connected to the frame and the functional unit and that the mower can also achieve snow blowing, snow plowing and other functions.

DESCRIPTION OF EMBODIMENTS

Reference will now be made to the drawing figures to describe the embodiments of the present disclosure in detail. In the following description, the same drawing reference numerals are used for the same elements in different drawings.

Figure 1:
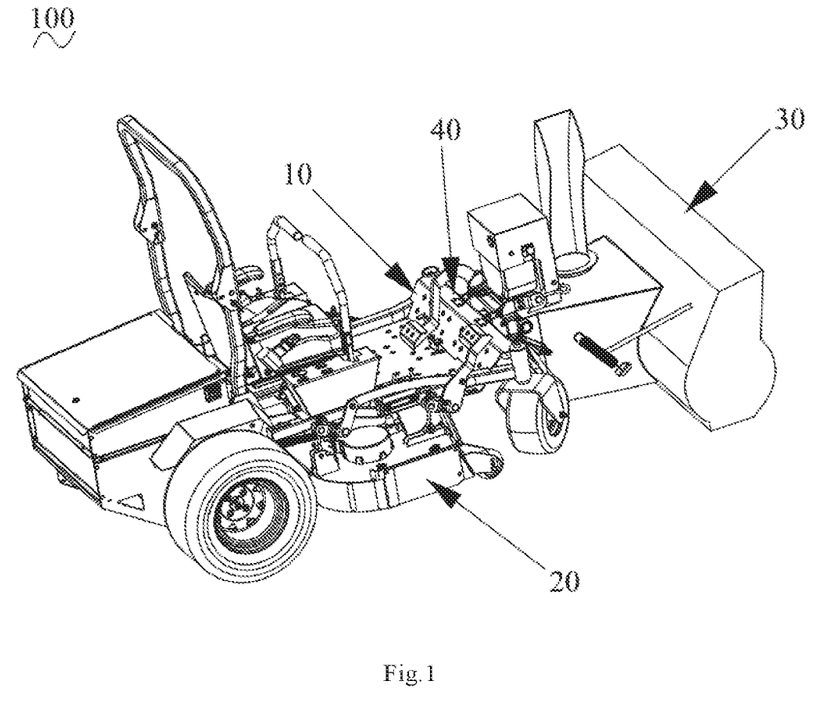
FIG. 1 is a perspective view of the riding lawn mower of the present invention.
Figure 2:
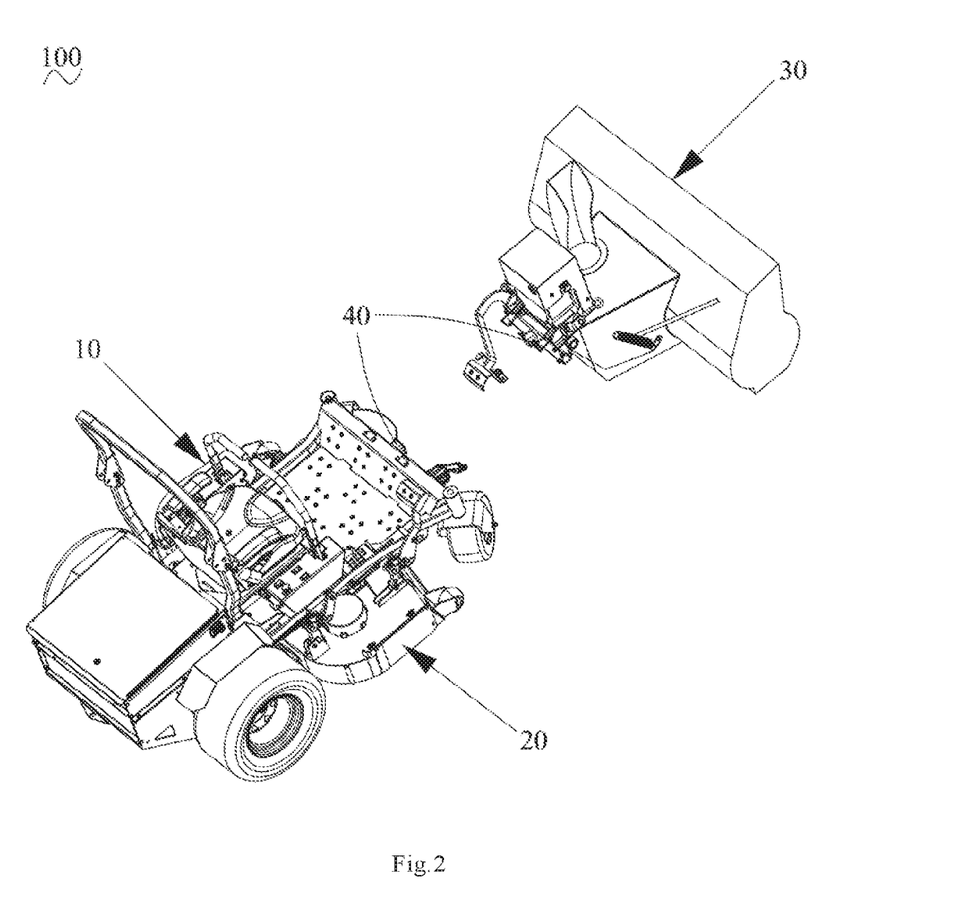
FIG. 2 is a partially exploded view of FIG. 1.

Referring to FIGS. 1 and 2, the present invention discloses a riding lawn mower 100, includes a frame 10, a mowing device 20 assembled to a bottom of the frame 10, a functional unit 30 assembled to a front of the frame 10, a motor group (not labeled) and a power supply (not labeled) assembled to the frame 10, and a connecting device 40 adapted for connecting the frame 10 and the functional unit 30.

The frame 10, the mowing device 20, the motor group and the power supply are all conventional technologies, and no more details will be described here.

The functional unit 30 is one of snow blower, snow thrower, snow plow and jack. Of course, it is also possible to choose for others according to actual needs.

Figure 3:
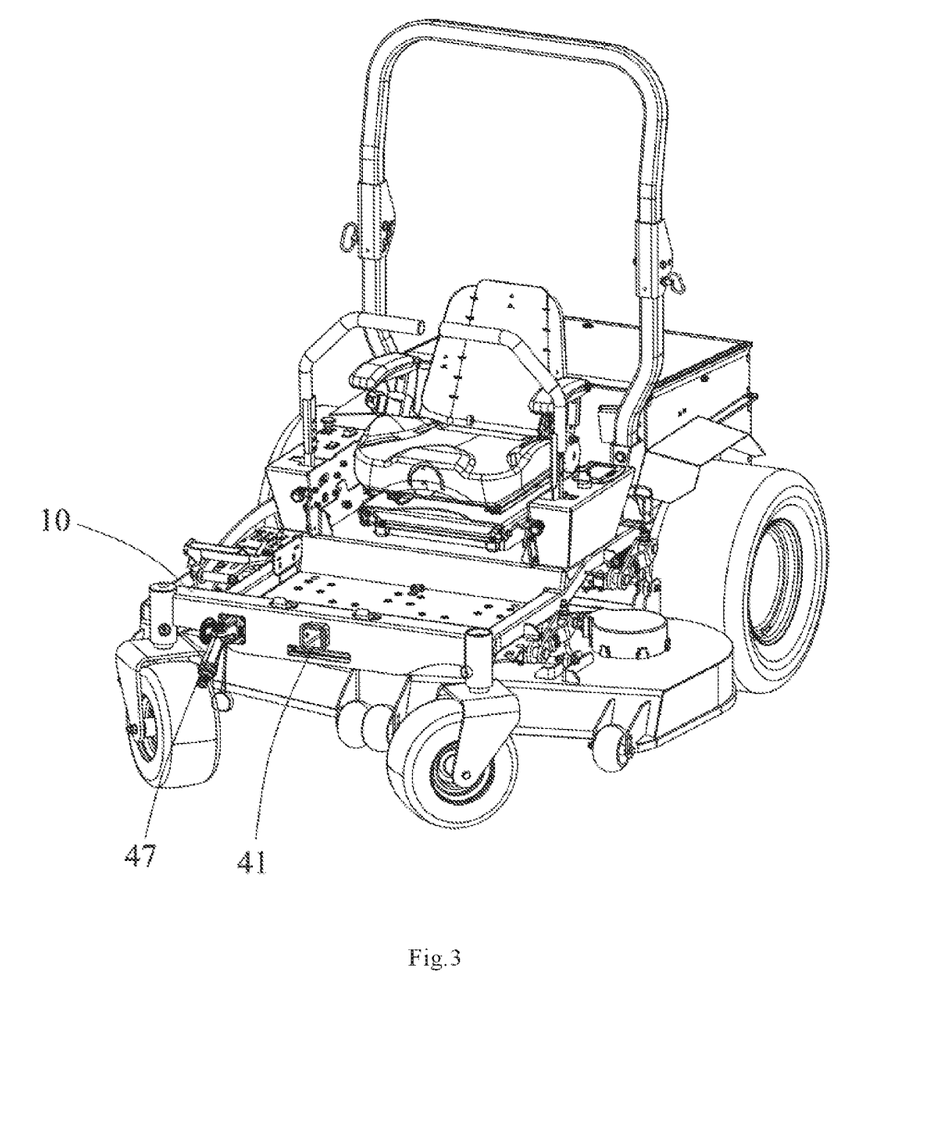
FIG. 3 is a perspective view of FIG. 2 with the functional unit removed.
Figure 4:
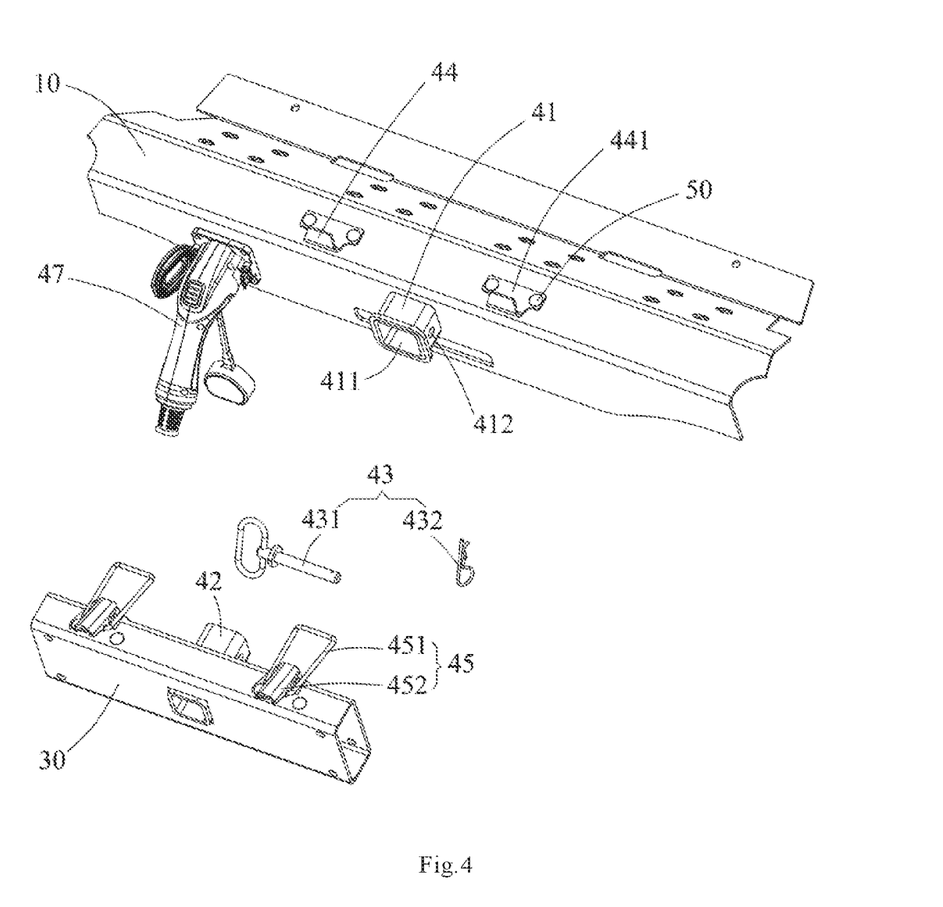
FIG. 4 is an exploded view of a connecting device of FIG. 2 with a reinforcing plate removed.
Figure 5:
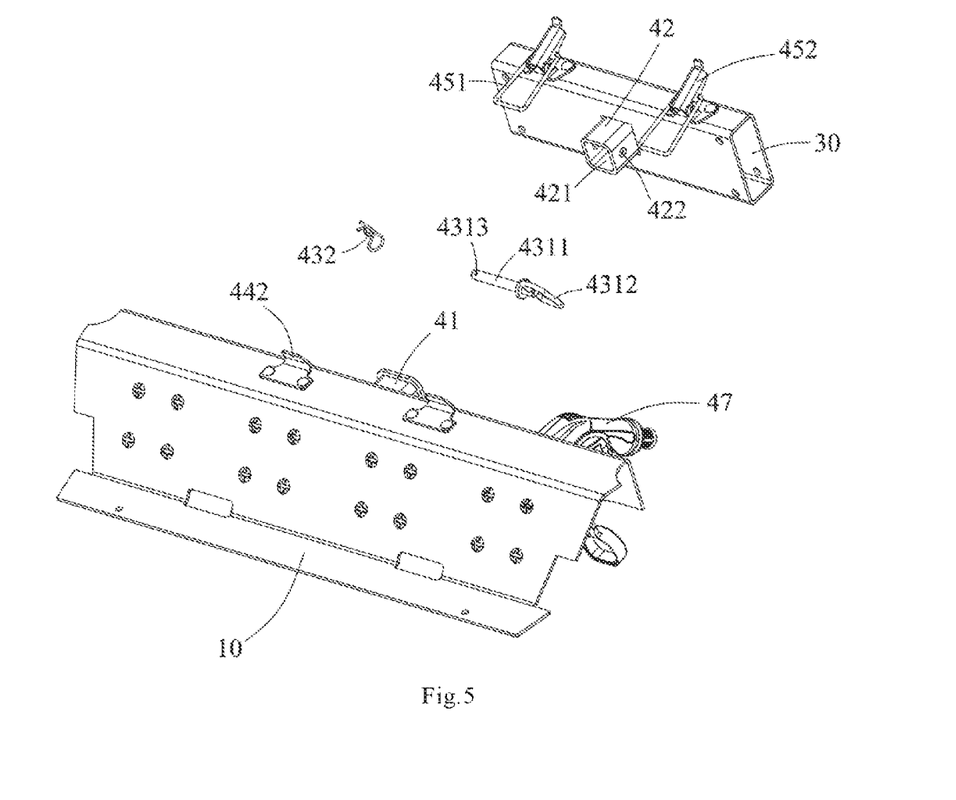
FIG. 5 is an exploded view of FIG. 4 from another perspective.

Referring to FIGS. 3-5, the connecting device 40 includes a first connector 41 arranged at the front of the frame 10, a second connector 42 arranged on the functional unit 30, and a third connector 43 for fixedly connecting the first connector 41 and the second connector 42. The first connector 41 and the second connector 42 defines through-holes thereon, respectively. The third connector 43 passes through the through-holes of the first connector 41 and the second connector 42 to securely connecting the first connector 41 and the second connector 42.

Specifically, the first connector 41 defines a receiving slot 411. One end of the second connector 42 is retained within the receiving slot 411. In the present invention, both the first connector 41 and the second connector 42 are designed in a square shape, and the receiving slot 411 is correspondingly configured to be a square shaped slot. The second connector 42 also defines a square cavity 421. As can be understood, the shapes of the first connector 41, the second connector 42, the receiving slot 411 and the cavity 421 can be correspondingly configured according to actual requires, which is not restricted here.

The through-holes includes first through-holes 412 opened on the first connector 41 and the second through-holes 422 opened on the second connector 42. The first through-holes 412 extend throughout the first connector 41, and communicates with the receiving slot 411; the second through-holes 422 extend throughout the second connector 42, and communicates with the cavity 421. In the present invention, the first through-holes 412 and the second through-holes 422 are circular holes, but it should not be a limitation.

The third connector 43 is a fixing pin subsequentially passing through the first through-hole 412 and the second through-hole 422. The fixing pin 43 includes a pin body 431 and a locking piece 432 extending through and inserting on the pin body 431. The pin body 431 has a column pin 4311 and a grip portion 4312 attached to a distal end of the column pin 4311. A third through-hole 4313 is opened on the end of the column pin 4322, which is away from the grip portion 4312. The locking piece 432 passes through the third through-hole 4313, which is aimed for firmly connecting the pin body 431 and the locking piece 432 on one hand, and on the other hand, used for restriction the displacement of the pin body 431.

In the present invention, the first connector 41 is formed by welding a stainless steel pipe of 60*60*5 on the front of the frame 10. The second connector 42 can be fixedly connected to the functional unit 30 like snow blower, snow thrower, snow plow or jack, by the method of welding, bolt connection etc. The third connector 43 may also be bolt structure or the like.

When assembling and fixing the functional unit 30 with the frame 10, one end of the second connector 42 extends firstly into the receiving slot 411 which makes the first through-hole 412 and the second through-hole 422 aligning to each other. Then, the column pin 4311 of the pin body 431 passes through the first through-hole 412 and the second through-hole 422 until the third through-hole 4313 of the column pin 4311 passes through the first connector 41. Finally, the locking piece 432 extends through the third through-hole 4313, at this moment, the functional unit 30 and the frame 10 realize the connection, and the third connector 43 may limit the relative displacement between the functional 30 and the frame 10, so that the stability of the connection is better.

As for the functional unit 30 such as snow blower, snow plow, due to the complicated structure and large weight thereof, the connection strength needs to be strengthened. At this time, the connecting device 40 may further include a buckle piece 44 provided on a top of the front of the frame 10 and a fastener piece 45 correspondingly provided on the functional unit 30, so that the buckle piece 44 engages with the fastener piece 45 to realize a fixed connection between the frame 10 and the functional unit 30.

Specifically, the buckle piece 44 is configured substantially in an L-shape, which includes a first lateral side 441 fixedly connecting to the frame 10 by a bolt 50 and a second lateral side 442 being substantially perpendicular to the frame 10. A top of the second lateral side 442 is slightly curved. The fastener piece 45 comprises a buckling ring 451, which is circular, and a locking member 452 for locking with the buckling ring 451. The buckling ring 451 and the locking member 452 are independent with each other and may move independently.

During further assembling and fixing the functional unit 30 with the frame 10 by the buckling piece 44 and the fastener piece 45, the buckling ring 451 is first sleeved on the lateral side 442 of the buckling piece 44. Then, the locking member 452 is pressed to secure the position of the buckling ring 451. At this moment, the buckling ring 451 is restricted under the top of the second lateral side 442 and cannot move randomly.

As can be seen, on the basis of utilizing the first connector 41, the second connector 42, and the third connector 43 to fixedly connect the functional unit 30 an the frame 10, the mutual interlocking of the buckling piece 44 and the fastener piece 45 enhances connection strength and connection stability between the functional unit 30 and the frame 10.

Figure 6:
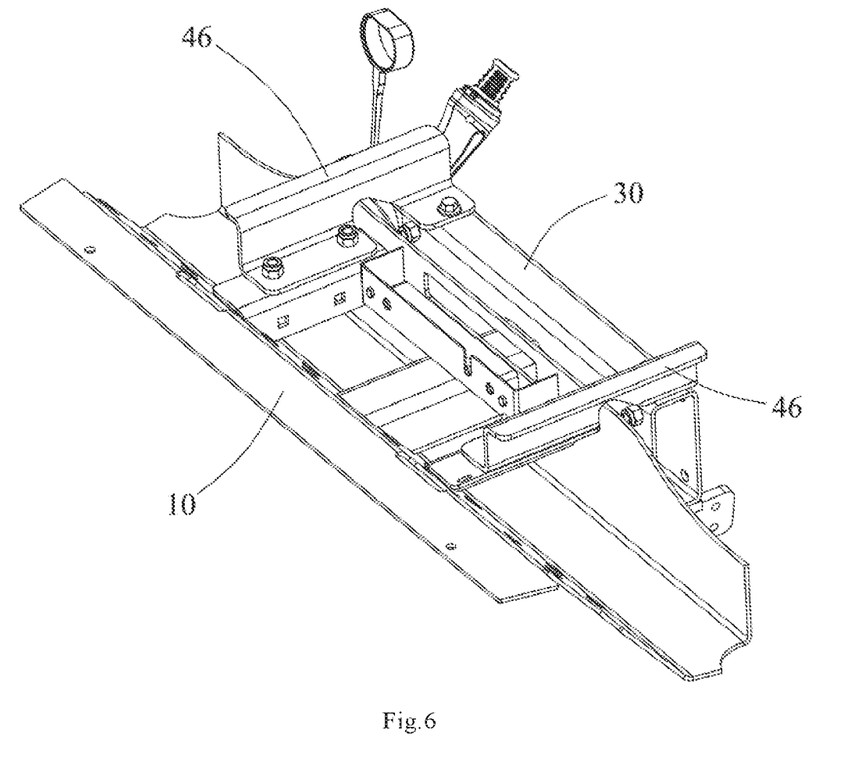
FIG. 6 is a perspective view of the reinforcing plate installed at the bottom of the frame.

As shown in FIG. 6, the connection strength need to be further enhanced regarding for the functional unit 30 with more complex structure and heavier weight. At the time, the connecting device 40 may also include a reinforcing plate 46 which has one end fixed to the front of the frame 10 and has the other end fixed to the functional unit 30. The reinforcing plate 46 is arranged at a bottom of the first connector 41 and the second connector 42 in order to fixedly connecting the frame 10 and the functional unit 30.

There are two reinforcing plates 46 capable of being employed which are respectively arranged at two opposite sides of the first connector 41 and the second connector 42, so that the connection stability between the functional unit 30 and the frame 10 is better. In order to improve the connection strength of the reinforcing plate 46, stain plate or plate in other material can be used as the reinforcing plate 46.

As shown in FIGS. 3 and 4, the connecting device 40 also includes an electrical interface 47 arranged in the front of the frame 10. One end of the electrical interface 47 electrically connects with the power supply located at a rear of the lawn mower and the other end of the electrical interface 47 is connected with the functional unit 30, so that the power supply provides power to the functional unit 30 by the electrical interface 47. In the present invention, the first connector 41 is positioned in a middle of the front of the frame 10, and the electrical interface 47 is positioned besides the first connector 41.

The first connector can be used as a mechanical interface to achieve a mechanical connection between the frame 10 and the functional unit, while the electrical interface 47 can be used to provide driving power for the functional unit 30. The electrical interface 47 can provide 82V power supply, the maximum 63 A bearing current, which basically meets the use of all functional units 30 below 5 kw (including 5 kw).

In summary, the riding lawn mower 100 of the present invention employs the first connector 41 and the buckling piece 44, which are provided on the front of the frame 10, and employs the second connector 42 and the fastener 45, which are correspondingly attached onto the functional unit 30, so that, by passing the third connector 43 through the first connector 41 and the second connector 42, and by the mutual interlocking between the buckling piece 44 and the fastener piece 45, the riding lawn mower 100 of the present invention can achieve a stable connection between the functional unit 30 and the frame 10 and also achieve multi-functions like snow blowing, snow plowing and others.

The riding lawn mower 100 of the present invention integrates multiple functions into one, so that the lawn mower can realize various functions according to needs, enrich the functions of the lawn mower, reduce the waste of resources, and reduce the user's expenditure on equipment, improve the use efficiency of the lawn mower. Simultaneously, the connection/disassembly of the functional unit 30 and the lawn mower is simple, convenient, stable and reliable, which not only improves the operator's work efficiency, but also improves the reliability of the entire structure.

It is to be understood, however, that even though numerous characteristics and advantages of preferred and exemplary embodiments have been set out in the foregoing description, together with details of the structures and functions of the embodiments, the disclosure is illustrative only; and that changes may be made in detail within the principles of present disclosure to the full extent indicated by the broadest general meaning of the terms in which the appended claims are expressed.

What is claimed is:

1. A riding lawn mower comprising:
a frame, a mowing device, the mowing device mounted to a bottom of the frame, a functional unit attached to a front of the frame, and a motor group together with a power supply mounted to the frame, wherein the riding lawn mower also comprises a connecting device connecting the frame and the functional unit, the connecting device comprising a first connector attached on the front of the frame, a second connector attached to the functional unit, and a third connector adapted for fixedly connecting the first connector and the second connector, the first connector and the second connector respectively defining through-holes thereon, the third connector extending through the through-holes of the first and the second connectors to fixedly connect the first and the second connectors;
wherein the connecting device also comprises a buckle piece provided on a top of the front of the frame and a fastener piece provided on the functional unit, the buckle piece engaging with the fastener piece to securely connect the frame and the functional unit.

2. The riding lawn mower as claimed in claim 1, wherein the first connector provides a receiving slot, and one end of the second connector is retained in the receiving slot.

3. The riding lawn mower as claimed in claim 2, wherein both the first connector and the second connector are square, and the receiving slot is square correspondingly.

4. The riding lawn mower as claimed in claim 1, wherein the through-holes comprise a first through-hole defined on the first connector and a second through-hole defined on the second connector, the first through-hole extending throughout the first connector and the second through-hole extending through-out the second connector.

5. The riding lawn mower as claimed in claim 4, wherein the third connector is a fixed pin that passes through the first through-hole and the second through-hole sequentially.

6. A riding lawn mower comprising:
a frame, a mowing device, the mowing device mounted to a bottom of the frame, a functional unit attached to a front of the frame, and a motor group together with a power supply mounted to the frame, wherein the riding lawn mower also comprises a connecting device connecting the frame and the functional unit, the connecting device comprising a first connector attached on the front of the frame, a second connector attached to the functional unit, and a third connector adapted for fixedly connecting the first connector and the second connector, the first connector and the second connector respectively defining through-holes thereon, the third connector extending through the through-holes of the first and the second connectors to fixedly connect the first and the second connectors, wherein the connecting device further comprises a reinforcing plate with one end thereof fastened to the front of the frame and the other end thereof fastened to the functional unit, the reinforcing plate positioned at a bottom of the first connector and the second connector.

7. The riding lawn mower as claimed in claim 1, wherein the connecting device further comprises an electrical interface provided on the front of the frame, the electrical interface having one end electrically connecting to the power supply and the other end connecting to the functional unit, so as to provide power to the functional unit.

8. The riding lawn mower as claimed in claim 7, wherein the first connector is arranged in a middle of the front of the frame and the electrical interface is located besides the first connector.

9. The riding lawn mower as claimed in claim 1, wherein the functional unit is one of a snow blower, snow thrower, snow plow, and jack.

* * * * *